United States Patent
Koladi et al.

(10) Patent No.: US 10,282,220 B2
(45) Date of Patent: May 7, 2019

(54) DYNAMIC ALLOCATION OF QUEUE DEPTHS FOR VIRTUAL FUNCTIONS IN A CONVERGED INFRASTRUCTURE

(71) Applicant: DELL PRODUCTS, L.P., Round Rock, TX (US)

(72) Inventors: Krishnaprasad Koladi, Bangalore (IN); Chandrashekar Nelogal, Round Rock, TX (US); Karan Singh Gandhi, Gurgaon (IN); Kiran Kumar Devarapalli, Telangana (IN)

(73) Assignee: Dell Products, L.P., Round Rock, TX (US)

( * ) Notice: Subject to any disclaimer, the term of this patent is extended or adjusted under 35 U.S.C. 154(b) by 624 days.

(21) Appl. No.: 14/933,720

(22) Filed: Nov. 5, 2015

(65) Prior Publication Data

US 2017/0134310 A1    May 11, 2017

(51) Int. Cl.
*G06F 9/455* (2018.01)
*G06F 9/4401* (2018.01)

(52) U.S. Cl.
CPC ............ *G06F 9/455* (2013.01); *G06F 9/4411* (2013.01)

(58) Field of Classification Search
CPC .............................. G06F 9/4411; G06F 9/455
See application file for complete search history.

(56) References Cited

U.S. PATENT DOCUMENTS

| | | | |
|---|---|---|---|
| 6,421,723 B1 | 7/2002 | Tawil | |
| 8,495,498 B2 * | 7/2013 | Domsch | G06F 9/45541 715/736 |
| 8,677,095 B2 * | 3/2014 | Clegg | G06F 9/44505 711/103 |
| 8,954,788 B2 * | 2/2015 | Abraham | G06F 13/102 714/4.5 |
| 9,043,501 B2 * | 5/2015 | Ben Yehuda | G06F 13/4221 710/15 |
| 9,201,681 B2 * | 12/2015 | Bert | G06F 9/45558 |
| 9,841,902 B2 * | 12/2017 | Baderdinni | G06F 3/061 |
| 9,842,074 B2 * | 12/2017 | Raghavan | G06F 13/362 |
| 2011/0246677 A1 | 10/2011 | Johnson et al. | |
| 2013/0297907 A1 | 11/2013 | Ki et al. | |

* cited by examiner

*Primary Examiner* — Van H Nguyen
(74) *Attorney, Agent, or Firm* — Isidore PLLC

(57) ABSTRACT

A method and an information handling system (IHS) dynamically modifies queue depth values based on changing relative workload demands of virtual functions. A controller, executing code of a queue depth profiler, determines, for each virtual function, an average number of total unfulfilled, outstanding requests. The controller compares values for an average number of total outstanding requests across the plurality of virtual functions. The controller determines a relative demand for request queue depth corresponding to each respective virtual function based on the compared values. The controller calculates desired queue depth values for each virtual function, based on the relative demand. The controller triggers completion of pending requests for a first processing state. In response to successful completion of the first processing state, the controller enables initiation of a second processing state in which request processing continues using the desired queue depth values.

18 Claims, 4 Drawing Sheets

US 10,282,220 B2

DYNAMIC ALLOCATION OF QUEUE DEPTHS FOR VIRTUAL FUNCTIONS IN A CONVERGED INFRASTRUCTURE

BACKGROUND

1. Technical Field

The present disclosure generally relates to information handling systems (IHS) and in particular to queue depth allocation within information handling systems.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems have a converged infrastructure. A converged infrastructure supports a unified computing system that provides management of servers, storage systems and network devices through the use of pre-configured bundles of software and hardware within a single chassis. The Dell PowerEdge VRTX is one example of an IHS having a converged infrastructure.

In the PowerEdge VRTX, queue depth allocation for virtual functions assigned to respective server blades are performed by the VRTX SPERC8. In particular, the VRTX SPERC8 currently provides a static allocation of queue depth for all the 4 VFs included with the PowerEdge VRTX. Basically the queue depth of the Shared PERC H710p controller is divided equally and blades in the 4 slots can equally make use of the queue depth.

During certain operations, one out of four server blades (e.g., blade 1) may require more I/O queue depth than the queue depth allocated to that server blade. In addition, other server blades (say blades 2, 3 and 4) may under-utilize their allocated I/O queue depth. In this scenario, blade 1 is starved out as there is an upper limit to the VF queue depth. Further, the command handling is currently on a first come first served basis. If a particular blade queues up a lot of commands, the commands from other blades (and/or corresponding virtual functions) may experience undue delay in command execution.

This problem is not specific to current VRTX and shared PERC products. This problem also applies to any environment where a single storage controller is or dual storage controllers are being shared between multiple hosts and resource allocation is not fine tuned to the requirements of each host. The issue with adjusting the queue depth is that several of the operating systems learn about the capabilities of a host bus adapter (HBA) during initialization and do not adjust key parameters such as queue depth during run time or on demand.

BRIEF SUMMARY

Disclosed are a method and an information handling system (IHS) that dynamically modifies queue depth values based on changing relative workload demands of virtual functions. A controller, using a queue depth profiler, determines, for each virtual function, an average number of total unfulfilled, outstanding requests. The controller compares parameter values for an average number of total outstanding requests across the plurality of virtual functions. The controller determines a relative demand for request queue depth corresponding to each respective virtual function based on the compared parameter values. The controller calculates for each virtual function, based on the relative demand, desired queue depth values, each representing a maximum number of outstanding commands that can be allocated to a respective virtual function. The controller triggers, via an OS device driver, completion of pending requests for a first processing state. In response to successful completion of the first processing state, the controller updates queue depth values from previous queue depth values to desired queue depth values, and enables initiation of a second processing state in which request queues are restarted or resumed based on a queue location at which the first processing state concluded, as request processing continues using the desired queue depth values.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
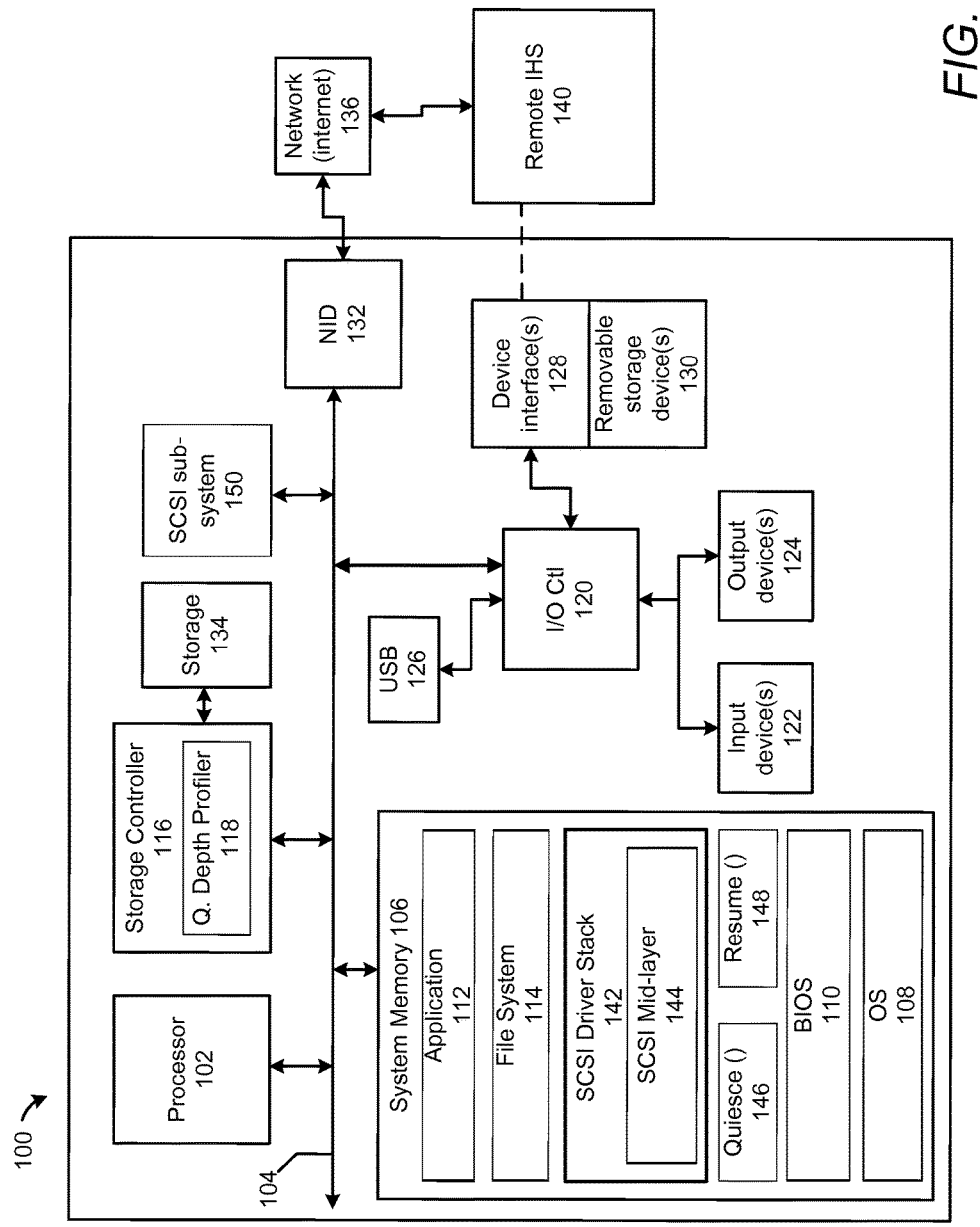
FIG. 1 illustrates an example information handling system (IHS) within which various aspects of the disclosure can be implemented, according to one or more embodiments.

The illustrative embodiments provide a method and an information handling system (IHS) that dynamically modifies queue depth values based on changing relative workload demands of virtual functions. A controller, using a queue depth profiler, determines for each virtual function an average number of total unfulfilled, outstanding requests. The controller compares parameter values for an average number of total outstanding requests across the plurality of virtual functions. The controller determines a relative demand for request queue depth corresponding to each respective virtual function based on the compared parameter values. The controller calculates for each virtual function, based on the relative demand, desired queue depth values, each representing a maximum number of outstanding commands that can be allocated to a respective virtual function. The controller triggers, via an OS device driver, completion of pending requests for a first processing state. In response to successful completion of the first processing state, the controller updates queue depth values from previous queue depth values to desired queue depth values, and enables initiation of a second processing state in which request queues are restarted or resumed as request processing continues using the desired queue depth values.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Those of ordinary skill in the art will appreciate that the hardware, firmware/software utility, and software components and basic configuration thereof depicted in the following figures may vary. For example, the illustrative components of the IHS are not intended to be exhaustive, but rather are representative to highlight some of the components that are utilized to implement certain of the described embodiments. For example, different configurations of an IHS may be provided, containing other devices/components, which may be used in addition to, or in place of, the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 106 via system interconnect 104. System interconnect 104 can be interchangeably referred to as a system bus, in one or more embodiments. Also coupled to system interconnect 104 is storage 134 within which can be stored one or more software and/or firmware modules and/or data (not specifically shown). In one embodiment, storage 134 can be a hard drive or a solid state drive. The one or more software and/or firmware modules within storage 134 can be loaded into system memory 106 during operation of IHS 100. As shown, system memory 106 can include therein a plurality of modules, including operating system (O/S) 108, Basic Input/Output System (BIOS) (110), application(s) 112 and firmware (not separately shown). In one or more embodiments, BIOS 110 comprises additional functionality associated with unified extensible firmware interface (UEFI), and is thus illustrated as and can be more completely referred to as BIOS/UEFI 110 in these embodiments. System memory 106 also includes file system 114 and Small Computer System Interface (SCSI) driver stack 142 that includes SCSI mid-layer 144. In addition, "quiesce" function 146 and "resume" function 148 are illustrated in system memory 106. The various software and/or firmware modules have varying functionality when their corresponding program code is executed by processor(s) 102 or other processing devices within IHS 100.

IHS 100 further includes one or more input/output (I/O) controllers 120 which support connection to, and processing of, signals from one or more connected input device(s) 122, such as a keyboard, mouse, touch screen, or microphone. I/O controllers 120 also support connection to, and forwarding of, output signals to one or more connected output device(s) 124, such as a monitor or display device or audio speaker(s). In addition, IHS 100 includes universal serial bus (USB) 126 which is coupled to I/O controller 120. Additionally, in one or more embodiments, one or more device interface(s) 128, such as an optical reader, a universal serial bus (USB), a card reader, Personal Computer Memory Card International Association (PCMCIA) port, and/or a high-definition multimedia interface (HDMI), can be associated with IHS 100. Device interface(s) 128 can be utilized to enable data to be read from, or stored to, corresponding removable storage device(s) 130, such as a compact disk (CD), digital video disk (DVD), flash drive, or flash memory card. In one or more embodiments, device interface(s) 128 can also provide an integration point for connecting other device(s) to IHS 100. In one implementation, IHS 100 connects to remote IHS 140 using device interface(s) 128. In such implementation, device interface(s) 128 can further include General Purpose I/O interfaces such as I²C, SMBus, and peripheral component interconnect (PCI) buses.

IHS 100 further comprises storage controller 116 which controls access to storage 134. As illustrated, storage controller 116 includes queue depth profiler firmware 118. IHS 100 also comprises Small Computer System Interface (SCSI) sub-system 150.

IHS 100 comprises a network interface device (NID) 132. NID 132 enables IHS 100 to communicate and/or interface with other devices, services, and components that are located external to IHS 100. These devices, services, and components can interface with IHS 100 via an external network, such as example network 136, using one or more communication protocols. In particular, in one implementation, IHS 100 uses NID 132 to connect to remote IHS 140 via an external network, such as network 136.

Network 136 can be a wired local area network, a wireless wide area network, wireless personal area network, wireless local area network, and the like, and the connection to and/or between network 136 and IHS 100 can be wired or wireless or a combination thereof. For purposes of discussion, network 136 is indicated as a single collective component for simplicity. However, it is appreciated that network 136 can comprise one or more direct connections to other devices as well as a more complex set of interconnections as can exist within a wide area network, such as the Internet.

Figure 2:
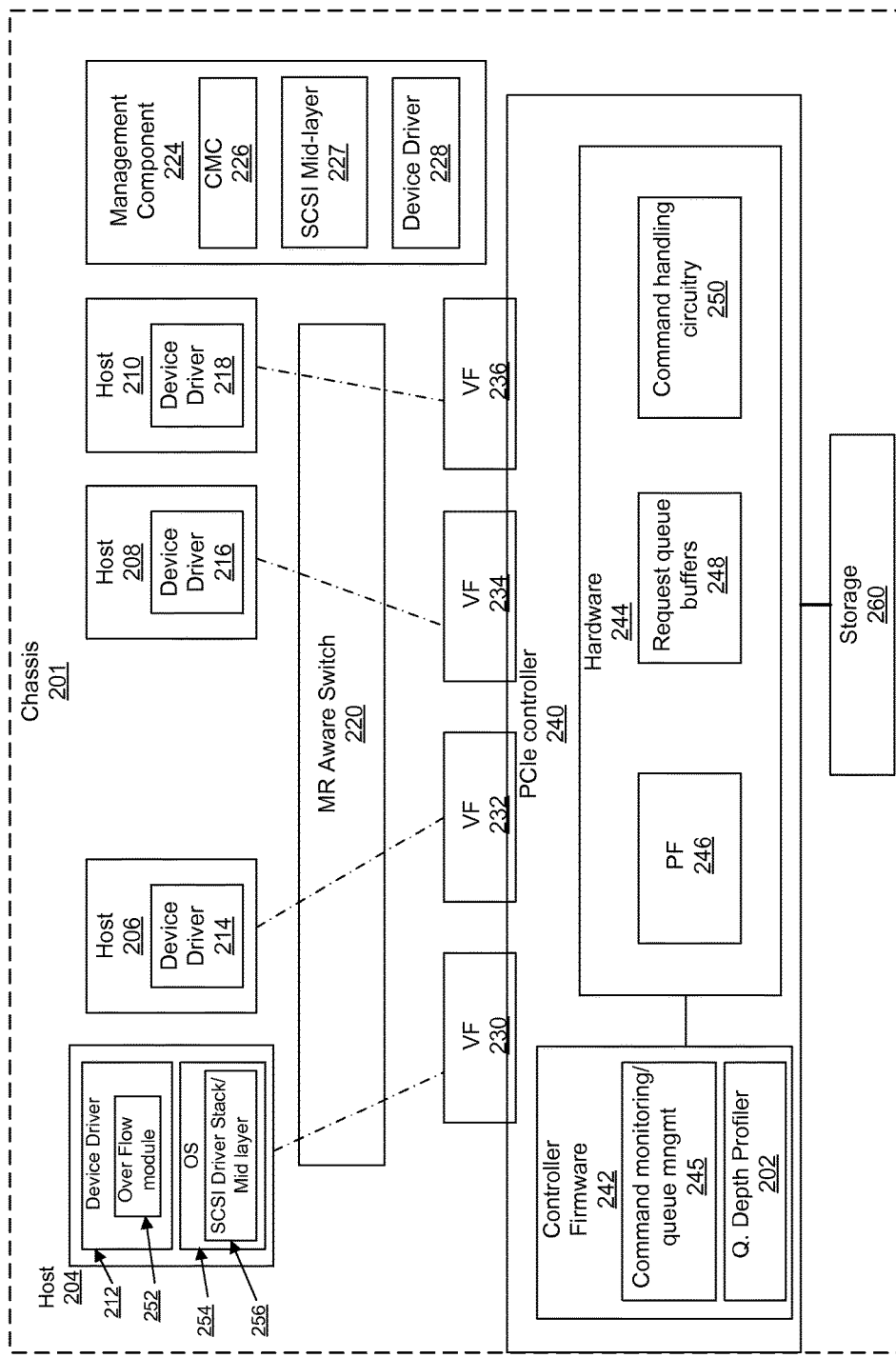
FIG. 2 depicts a block diagram illustration of an IHS having a converged infrastructure, according to one or more embodiments.

FIG. 2 depicts a block diagram illustration of an IHS having a converged infrastructure, according to one or more embodiments. IHS 200 comprises multiple host compute nodes represented by first host compute node 204, second host compute node 206, third host compute node 208 and fourth host compute node 210. Host compute nodes 204, 206, 208 and 210 respectively comprise first VF/device driver 212, second device driver 214, third device driver 216 and fourth device driver 218 (also referred to herein as OS device driver). IHS 200 also comprises multi-root input/output virtualization (MRIOV) aware peripheral component interconnect express (PCIe) switch 220. MRA switch 220 is coupled to host compute nodes 204, 206, 208 and 210 via multiple root endpoint ports (not explicitly shown). MRA switch 220 is also coupled to a PCIe controller 240. In one embodiment, PCIe controller 240 is a single root input/output virtualization (SR-IOV) PCIe controller.

IHS 200 further comprises management component 224 which includes chassis management controller (CMC) 226 which manages requests for PCIe adapter/controller functionality. CMC 226 "owns" a Physical Function (PF) of the PCIe device, while host compute nodes "own" respective virtual functions (VFs). Also illustrated within management component 224 is SCSI mid-layer 227 and device driver 228. Also illustrated within IHS 200 is storage 260 coupled to PCIe controller 240. In one embodiment, storage 260 represents one or more disks. Also illustrated within FIG. 2 is chassis 201.

PCIe controller 240 comprises controller firmware 242 and hardware 244. Illustrated within controller firmware 242 is queue depth profiler 202. Hardware 244 comprises physical function (PF) 246, request queue buffers 248 and command handling circuitry 250. PCIe 240 also provides virtual functions (VFs) which include first VF 230, second VF 232, third VF 234 and fourth VF 236. VFs 230, 232, 234 and 236 are respectively allocated to server/host compute nodes 204, 206, 208 and 210. In IHS 200, the VFs are, for convenience, illustrated as components that are substantially adjacent to PCIe controller 240 to identify these virtual functions as virtualized resources as opposed to hardware, software or firmware resources.

Host compute node 204 comprises device driver 212 which includes overflow module 252 for performing queue monitoring. In addition, host compute node 204 includes OS 254 which includes SCSI Driver Stack/Mid layer 256. Overflow module 252 detects an over queue condition and also counts a number of additional requests beyond a queue depth allocated to a particular VF and advertised by a corresponding device driver to the respective operating system. When the over queue condition is detected, the operating system (SCSI Mid layer 256/Storport) does not send additional requests to be counted by VF Firmware 242. Firmware 242 can detect a queue full condition, while overflow module 252 detects the number of additional requests. Host compute nodes 206, 208 and 210 have a similar configuration to a configuration of host compute node 204.

Controller 240, executes code of controller firmware 242, including queue depth profiler 202, to initiate a time-based profiling window/interval to monitor outstanding requests originated by server/host compute nodes 204, 206, 208 and 210 via respective VFs 230, 232, 234 and 236. In one or more embodiments, controller firmware 242 includes a command monitoring module and a queue management module, collectively illustrated as command monitoring/queue management module 245. Controller 240 executes code of queue depth profiler 202 and enables queue depth profiling to be initiated by one of: (a) dynamic, on demand user activation; and (b) a pre-configured setting to enable automatic execution at periodic intervals. Controller 240 initiates the profiling window to perform profiling measurements. In one embodiment, Controller 240 configures the profiling window to accommodate various different types of workload processing operations.

Controller 240 determines outstanding requests for each VF based on corresponding queue depths in request queue buffers 248. Controller 240 determines for each virtual function an average number of total unfulfilled, outstanding requests. In one embodiment, controller 240 also determines other parameter values associated with an average number of total outstanding requests across the plurality of virtual functions. For example, controller 240 determines parameter values for parameters that include one or more of an average minimum number of total outstanding requests and an average maximum number of total outstanding requests. Controller 240 compares the parameter values associated with an average number of total outstanding requests across the plurality of virtual functions. Controller 240 determines a relative demand for request queue depth corresponding to each respective virtual function based on the compared parameter values.

Based on the relative demands computed for respective virtual functions, controller 240 determines whether a threshold change in relative demand for at least one VF is detected. If a threshold change in relative demand is not detected for at least one VF, controller 240 maintains the queue depth values from a current, first processing state. However, in response to detecting a threshold change in relative demand for at least one VF, controller 240 generates desired hosts queue depth values for each VF based on relative demand. Controller 240 generates the desired hosts queue depth values to be utilized during a next, second processing state.

In one embodiment, in response to a first relative demand for a first virtual function exhibiting a substantial increase (i.e., at least a threshold increase) compared with a second relative demand for a second virtual function during queue depth profiling, controller 240 provides a first desired queue depth value for the first virtual function and a second desired queue depth value for the second virtual function during the second processing state. In this case, the first desired queue depth value represents a net increase of queue depth relative to the second desired queue depth. More generally, if the queue depth of at least one VF needs to change, then the queue depth of at least one other VF also needs to change, since the sum of queue depths for respective VFs represents a static, total cumulative queue depth. Furthermore, if multiple VFs require respective increases in queue depth based on workload history, controller 240 updates corresponding queue depth allocations for the second processing state based on queue depth requirements for all relevant VFs, including VFs for which increases in queue depth allocation are required. In one or more embodiments, controller 240 increases the queue depth for a given VF by a set amount and then readjusts or provide further adjustments in a "self-learning" mode during a next profile period.

In response to detecting the threshold change in relative demand for at least one VF, controller 240 calculates for each virtual function, based on the relative demand, desired queue depth values, each representing a maximum number of outstanding commands that can be allocated to a respective virtual function. Controller 240 triggers, via an OS device driver, completion of pending requests for each VF for a first processing state. In particular, controller 240 invokes a queue depth change request to an OS device driver using asynchronous event notifications (AENs), which are received by VFs in respective hosts. The invoked request enables completion of pending requests for a first processing state that uses one of (a) previous queue depth values corresponding to previous demands for request queue depth and (b) default queue depth values.

In response to the asynchronous notification for each VF, the VF/device driver in each host compute node initiates a state transition to "quiesce" and subsequently to "resume". In one implementation, these state transitions involve a respective SCSI mid layer 256. In another implementation, another equivalent component (such as Storport, a Windows platform component) is utilized to "quiesce" and "resume" the I/O processing queue within each host compute node.

Controller 240 enables VFs to initiate a "quiesce I/O" mode, to enable completion of pending operations/requests. When the device is in this state/mode, only special requests will be accepted, all others will be deferred and requeued. In each respective host compute node, a "quiesce" function such as quiesce 146 can block all user issued commands including file-system commands. In one embodiment, since special requests include requeued requests, a successful return doesn't guarantee the host compute node/device will be completely quiescent. Following successful completion of pending requests, controller 240 enables a respective SCSI mid-layer 256 to learn about generated queue depth values which are calculated by the firmware and driver based on the profiling data. In one embodiment, controller 240 enables each VF to receive a completion status of pending requests. In one implementation, the completion status is indicated as one of "success" and "failure". In response to successful completion of the first processing state, controller 240 provides updates to respective queue depth values within a Small Computer System Interface (SCSI) sub-system that provides a mechanism for transferring data between host devices and storage. More generally, controller 240 enables or detects when the VF drivers update queue depth values for the VFs from previous queue depth values to desired queue depth values, and controller 240 detects when the device driver initiates a second processing state in which request queues are restarted as request processing continues using the desired queue depth values.

Controller 240, executing controller firmware 242, reconfigures, in a converged infrastructure of the IHS, the queue depth of the storage controller, without re-initializing the OS device drivers in respective host compute nodes 204, 206, 208 and 210. Furthermore, controller 240 enables a queue depth modification without requiring a restart of a host operating system and/or reboot of a corresponding host node. Controller 240 applies a priority weighting to processing commands from each virtual function depending on at least one of: (a) a queue depth assigned to each virtual function; and (b) a number of pending commands from each virtual function.

Figure 3:
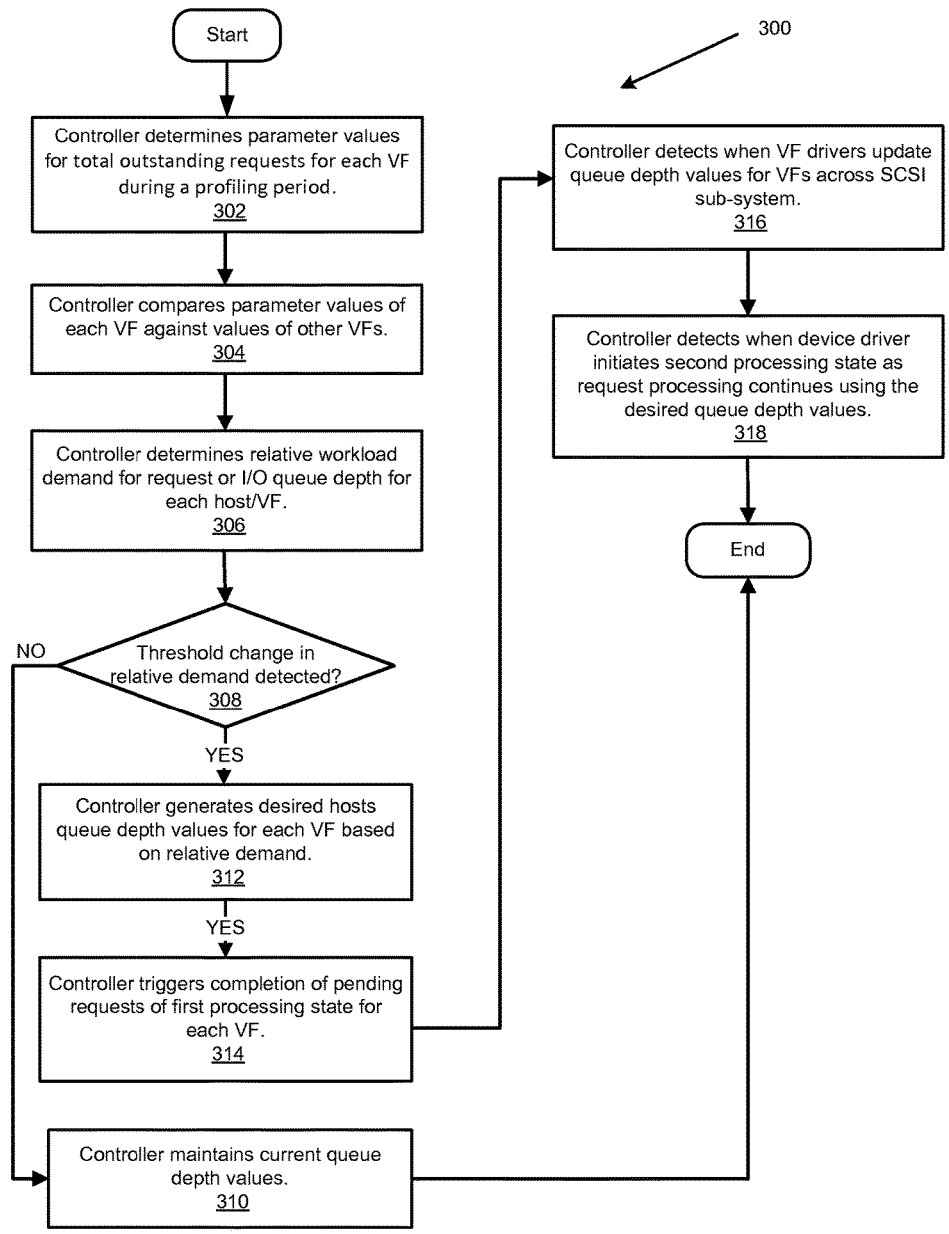
FIG. 3 is a flow chart illustrating a method for dynamically modifying queue depth values based on relative workload demands of virtual functions, according to one embodiment.
Figure 4:
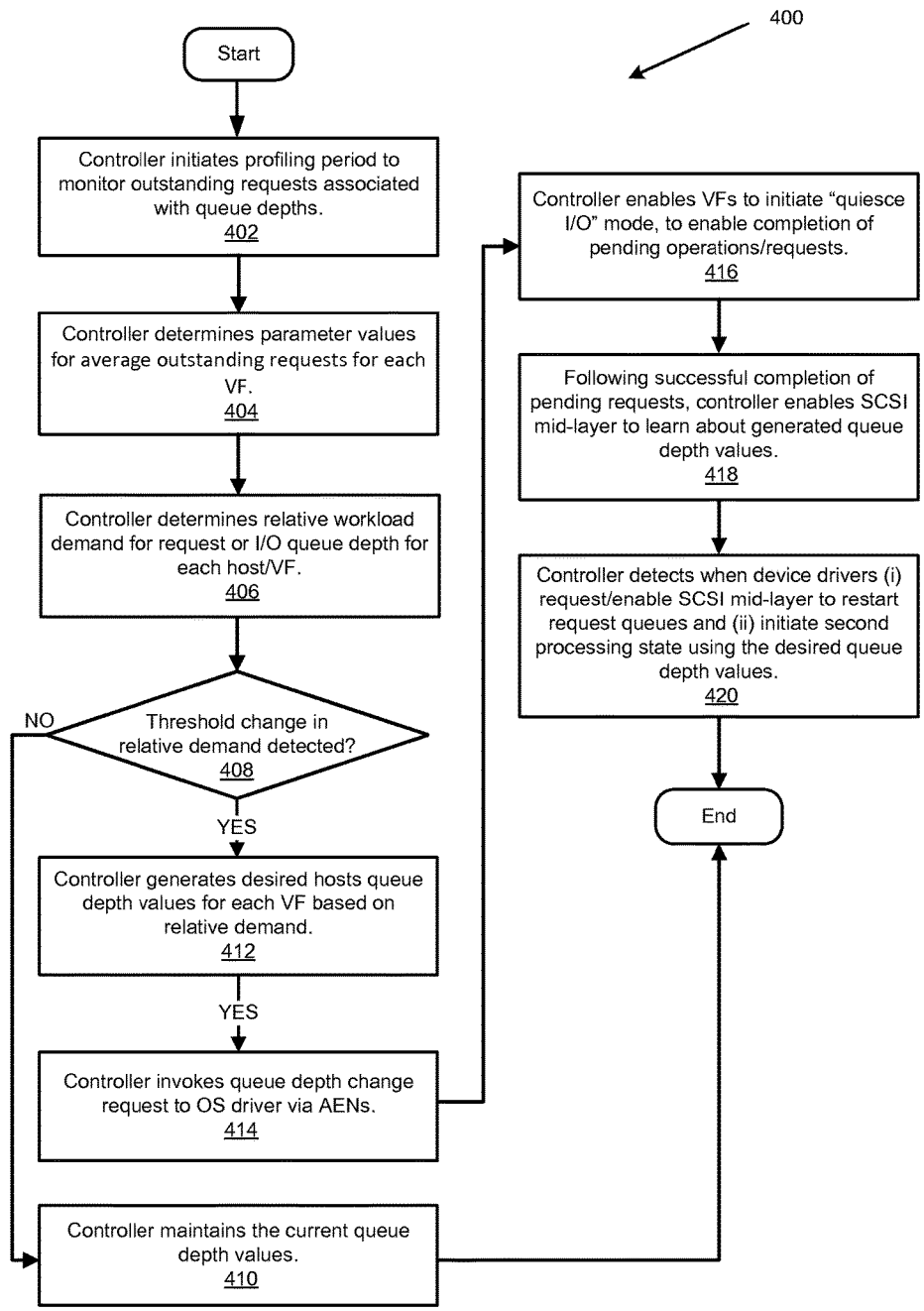
FIG. 4 is a flow chart illustrating a method for utilizing operating system (OS) drivers to dynamically modify queue depth values based on relative workload demands of virtual functions, according to one embodiment.

FIGS. 3 and 4 present flowcharts illustrating example methods by which IHS 100, and specifically, controller 116 and queue depth profiler 118 presented within the preceding figures, perform different aspects of the processes that enable one or more embodiments of the disclosure. Method 300 represents a method for dynamically modifying queue depth values based on relative workload demands of virtual functions. Method 400 represents a method for utilizing operating system (OS) drivers to dynamically modify queue depth values based on relative workload demands of virtual functions. The description of each method is provided with general reference to the specific components illustrated within the preceding figures. It is appreciated that certain aspects of the described methods may be implemented via other processing devices and/or execution of other code/firmware. In the discussion of FIGS. 3 and 4, reference is also made to elements described in FIGS. 1-2.

Method 300 begins at the start block and proceeds to block 302 at which controller 116/queue depth profiler 118 determines parameter values for at least one of an average total outstanding requests, minimum total outstanding requests, and maximum total outstanding requests, for each virtual function during a profiling period. A count of total outstanding requests provides a measure of queue depth. In one embodiment, controller 116 uses host device drivers to detect queue full conditions for each VF during the profiling period. In addition, controller 116 tracks a number of detected queue full conditions for each VF. Controller 116 compares parameter values of each VF against values of other VFs (block 304). Controller 116 determines a relative workload demand for I/O (request) queue depth for each host/VF (block 306). In one embodiment, controller 116 uses the tracked number of detected queue full conditions as a factor in determining the relative workload demand for request queue depth. Controller 116 determines whether a threshold change in relative demand for at least one VF is detected (decision block 308). If the threshold change in relative demand for at least one VF is not detected, controller 116 maintains the current queue depth values (block 310). If the threshold change in relative demand for at least one VF is detected, controller 116 generates desired hosts queue depth values for each VF based on relative demand (block 312). Controller 116 triggers completion of pending requests of first processing state for each VF (block 314). Controller 116 detects when VF drivers update queue depth values for VFs across SCSI sub-system (block 316). Controller 116 detects when the device driver initiates a second processing state in which request queues are restarted as request processing continues using the desired queue depth values (block 318). The process concludes at the end block.

Method 400 begins at the start block and proceeds to block 402 at which controller 116 initiates a profiling period to monitor outstanding requests associated with queue depths. Controller 116 determines parameter values for average outstanding requests for each VF (block 404). Controller 116 determines a relative workload demand for I/O (request) queue depth for each host/VF (block 406). Controller 116 determines whether a threshold change in relative demand for at least one VF is detected (decision block 408). If the threshold change in relative demand for at least one VF is not detected, controller 116 maintains the current queue depth values (block 410). If the threshold change in relative demand for at least one VF is detected, controller 116 generates desired hosts queue depth values for each VF based on relative demand (block 412). For example, the generated queue depth values include an increased first queue depth value and a second, decreased queue depth value, for respective VFs. Controller 116 invokes queue depth change requests to respective OS device drivers using corresponding asynchronous event notifications (AENs), which are received by VFs in respective hosts (block 414). In one or more aspects, if the queue depth of at least one VF needs to change, then the queue depth of at least one other VF also needs to change, since the sum of queue depths for respective VFs represents a static, total cumulative queue depth. Controller 116 enables or detects when a device driver for a corresponding OS in each respective host compute node initiates "quiesce I/O" mode, to enable completion of pending operations/requests (block 416). Following successful completion of pending requests, controller 116 detects when the VF/device drivers within respective host compute nodes request/enable a respective SCSI midlayer 256 to learn about generated queue depth values (block 418). In one embodiment, controller 116 enables each VF to receive a completion status of pending requests. In one implementation, the completion status is indicated as one of "success" and "failure". Controller 116 detects when the device driver requests the respective SCSI mid-layer to "resume" the input-output queue to service requests, and detects when the device driver initiates a second processing state in which request queues are restarted or resumed as request processing continues using the desired queue depth values (block 420). The process concludes at the end block.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system comprising:
   a processor;
   a memory system comprising an operating system (OS) and at least one device driver;
   a plurality of host devices communicating input/output (I/O) requests with a plurality of virtual functions, respectively, wherein each host device comprises a corresponding device driver;
   a peripheral component interconnect express (PCIe) storage controller communicatively coupled to the plurality of host devices and comprising:
      the plurality of virtual functions; and
      a controller firmware comprising: a command monitoring module; a queue management module; and a queue depth profiler;
   wherein the (PCIe) storage controller executes code of the controller firmware, which configures the (PCIe) storage controller to:
      determine for each virtual function (VF), using the command monitoring module, a value for at least one parameter associated with unfulfilled, outstanding requests, the at least one parameter including a count of total outstanding requests;
      compare parameter values associated with outstanding requests across the plurality of virtual functions;
      determine a relative demand for request queue depth for each respective VF based on the compared parameter values;
      determine whether a threshold change in relative demand for at least one VF is detected; and
      in response to detecting the threshold change in relative demand for at least one VF:
         calculate for each VF, based on the relative demand, desired queue depth values, each representing a maximum number of outstanding commands that can be allocated to a respective VF;
         initiate a "quiesce I/O" mode and initiate completion of pending requests for a first processing state; and
         in response to successful completion of the pending requests for the first processing state: updates queue depth values from previous queue depth values to the desired queue depth values; resumes I/O processing queues; and initiates a second processing state to continue processing requests using current, desired queue depth values.

2. The IHS of claim 1, further comprising a Small Computer System Interface (SCSI) sub-system, wherein the controller:
   maintains the current queue depth values from the first processing state in response to not detecting a threshold change in relative demand for at least one VF;
   in response to a threshold change in relative demand for at least one VF being detected, invokes, via an OS device driver, a request for a change in queue depth for each of at least one VF to correspond with the relative demands for request queue depth for respective virtual functions;
   wherein the invoked request enables a completion of pending requests for a first processing state that uses one of (a) previous queue depth values corresponding to previous demands for request queue depth and (b) default queue depth values;
   in response to successful completion of the first processing state, updating respective queue depth values within a Small Computer System Interface (SCSI) sub-system that provides a mechanism for transferring data between host devices and storage; and
   in response to detecting the updates, initiates the second processing state in which request queues are resumed to continue processing requests.

3. The IHS of claim 1, wherein the queue depth profiler represents a first component having a profiling capability and the OS device drivers represent additional components having corresponding profiling capability, wherein the profiling capability enables detection of queue full conditions on a per virtual function basis, wherein the queue depth profiler and the OS device drivers enable cooperative, collaborative processes that perform queue depth measurement functions and provide profiling measurements.

4. The IHS of claim 1, wherein the controller:
   in response to a first relative demand for a first virtual function exhibiting at least a threshold increase compared with a second relative demand for a second virtual function during queue depth profiling, provides a first desired queue depth value for the first virtual function and a second desired queue depth value for the second virtual function during the second processing state, wherein the first desired queue depth value represents a net increase of queue depth relative to the second desired queue depth.

5. The IHS of claim 1, wherein the controller executes code of the queue depth profiler, which configures the controller to enable queue depth profiling to be initiated by one of: (a) dynamic, on-demand user activation; and (b) a pre-configured setting to enable automatic execution at periodic intervals.

6. The IHS of claim 1, wherein the controller:
selects a time-based profiling window during which profiling measurements are performed, wherein a profiling window can be configured to accommodate various different types of workload processing operations.

7. The IHS of claim 1, wherein the controller:
determines parameter values for average total outstanding requests, minimum total outstanding requests and maximum total outstanding requests for each virtual function during a profiling window period.

8. The IHS of claim 1, wherein the controller:
reconfigures, in a converged infrastructure of the IHS, the queue depth of the storage controller to modify queue depths of corresponding host devices, while avoiding at least one of (i) re-initializing respective OS device drivers and (ii) rebooting respective host devices.

9. The IHS of claim 1, wherein the controller:
applies a priority weighting to processing commands from each virtual function depending on at least one of: (a) a queue depth assigned to each virtual function; and (b) a number of pending commands from each virtual function.

10. In an information handling system (IHS), a processor-implemented method comprising:
determining, for each virtual function, a value for at least one parameter associated with unfulfilled, outstanding requests, the at least one parameter including a count of total outstanding requests;
comparing parameter values associated with outstanding requests across the plurality of virtual functions;
determining a relative demand for request queue depth for each respective virtual function based on the compared parameter values;
determining whether a threshold change in relative demand for at least one virtual function (VF) is detected; and
in response to a threshold change in relative demand for at least one VF being detected:
calculating for each virtual function, based on the relative demand, desired queue depth values each representing a maximum number of outstanding commands that can be allocated to a respective VF;
initiating a "quiesce I/O" mode and initiating completion of pending requests for a first processing state; and
in response to successful completion of the pending requests for the first processing state:
updating queue depth values from previous queue depth values to the desired queue depth values;
resuming I/O processing queues; and
initiating a second processing state to continue processing requests using the desired queue depth values.

11. The method of claim 10, further comprising:
maintaining the current queue depth values from the first processing state in response to not detecting a threshold change in relative demand for at least one VF;

in response to a threshold change in relative demand for at least one VF being detected, invoking via an operating system (OS) device driver a request for a change in queue depth for each of at least one virtual function to correspond with the relative demands for request queue depth for respective virtual functions;
wherein the invoked request enables a completion of pending requests for a first processing state that uses one of (a) previous queue depth values corresponding to previous demands for request queue depth and (b) default queue depth values;
wherein in response to successful completion of the first processing state, providing updates to respective queue depth values within a Small Computer System Interface (SCSI) sub-system that provides a standard for transferring data between host devices and storage;
in response to providing the updates, initiating the second processing state in which request queues are resumed to continue processing requests.

12. The method of claim 10, further comprising:
detecting queue full conditions on a per virtual function basis, wherein a queue depth profiler and OS device drivers enable cooperative, collaborative processes that perform queue depth measurement functions and provide profiling measurements.

13. The method of claim 10, further comprising:
in response to a first relative demand for a first virtual function exhibiting at least a threshold increase compared with a second relative demand for a second virtual function during queue depth profiling, providing a first desired queue depth value for the first virtual function and a second desired queue depth value for the second virtual function during the second processing state, wherein the first desired queue depth value represents a net increase of queue depth relative to the second desired queue depth.

14. The method of claim 10, further comprising:
enabling queue depth profiling, using a queue depth profiler, to be initiated by one of: (a) dynamic, on demand user activation; and (b) a pre-configured setting to enable automatic execution at periodic intervals.

15. The method of claim 10, further comprising:
selecting a time-based profiling window during which profiling measurements are performed, wherein a profiling window can be configured to accommodate various different types of workload processing operations.

16. The method of claim 10, further comprising:
determining parameter values for average total outstanding requests, minimum total outstanding requests and maximum total outstanding requests for each virtual function during a profiling window period.

17. The method of claim 10, further comprising:
reconfiguring, in a converged, unified computing infrastructure of the IHS, the queue depth of the storage controller to modify queue depths of corresponding host devices while avoiding at least one of (i) re-initializing respective OS device drivers and (ii) rebooting respective host devices.

18. The method of claim 10, further comprising:
applying a priority weighting to processing commands from each virtual function depending on at least one of:
(a) a queue depth assigned to each virtual function; and
(b) a number of pending commands from each virtual function.

* * * * *